United States Patent
Kanagawa

(10) Patent No.: US 8,958,525 B2
(45) Date of Patent: Feb. 17, 2015

(54) RADIOGRAPHIC IMAGING APPARATUS AND METHOD

(75) Inventor: Eiichi Kanagawa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 251 days.

(21) Appl. No.: 13/524,941

(22) Filed: Jun. 15, 2012

(65) Prior Publication Data

US 2012/0318986 A1 Dec. 20, 2012

(30) Foreign Application Priority Data

Jun. 15, 2011 (JP) ................................. 2011-132769

(51) Int. Cl.
*A61B 6/00* (2006.01)
*G01T 1/29* (2006.01)

(52) U.S. Cl.
CPC .................... *G01T 1/2928* (2013.01)
USPC .............................................. 378/22; 378/97

(58) Field of Classification Search
USPC ....................... 378/21, 22, 97, 98.8
See application file for complete search history.

(56) References Cited

U.S. PATENT DOCUMENTS

| | | | |
|---|---|---|---|
| 2007/0036265 A1* | 2/2007 | Jing et al. | 378/37 |
| 2007/0081625 A1* | 4/2007 | Sendai | 378/37 |
| 2008/0247509 A1 | 10/2008 | Kashiwagi | |
| 2012/0049077 A1* | 3/2012 | Okada | 250/370.08 |

FOREIGN PATENT DOCUMENTS

| | | |
|---|---|---|
| JP | 2001-010870 A | 1/2001 |
| JP | 2004-170216 A | 6/2004 |
| JP | 2008-253555 A | 10/2008 |
| JP | 2010-158561 A | 7/2010 |
| JP | 2010-279516 A | 12/2010 |

OTHER PUBLICATIONS

Japanese Office Action "Notification of Grounds for Rejection" dated Apr. 16, 2013, which correspodends to Japanese Patent Application No. 2011-132769 and is related to U.S. Appl. No. 13/524,941 with partisl translation.
An Office Action "Notification of Grounds for Rejection" dated Sep. 17, 2013, which corresponds to Japanese Patent Application No. 2011-132769 and is related to U.S. Appl. No. 13/524,941 with partial English translation.
An Office Action "Notification of Grounds for Rejection" dated Jul. 23, 2013, which corresponds to Japanese Patent Application No. 2011-132769 and is related to U.S. Appl. No. 13/524,941 with partial translation.

* cited by examiner

*Primary Examiner* — Glen Kao
(74) *Attorney, Agent, or Firm* — Studebaker & Brackett PC

(57) ABSTRACT

A radiation source is relatively moved with respect to a radiation detector, on which a plurality of short-circuited pixels formed by short-circuiting TFT switches are arranged across the entire surface thereof. Radiation is irradiated onto a subject at a plurality of radiation source positions, in association with movement of the radiation source. A plurality of images corresponding to each of the plurality of the radiation source are obtained. Positions of detection short-circuited pixels for detecting a dose of radiation are set, respectively corresponding to the plurality of radiation source positions. The dose of radiation output from the radiation source is controlled, based on electric signals read out from the detection short-circuited pixels, at each of the plurality of radiation source positions.

5 Claims, 4 Drawing Sheets

RADIOGRAPHIC IMAGING APPARATUS AND METHOD

FIELD OF THE INVENTION

The present invention relates to a radiographic imaging apparatus and a radiographic imaging method for imaging a subject form a different plurality of imaging directions and obtaining a plurality of radiographic images.

DESCRIPTION OF THE RELATED ART

In recent years, there has been proposed a tomosynthesis imaging method in a radiographic imaging apparatus, in which a subject is irradiated from different angles by moving a radiation source in order to observe a site of disease in more detail and the obtained images are added, to obtain an image in which a desired cross-section is emphasized. In the tomosynthesis imaging method, a plurality of images are obtained, by moving the radiation source parallel to the radiation detector, in an arc of a circle, or in an ellipse, and by irradiating a subject with radiation from different irradiation angles, i.e., from a plurality of radiation source positions, according to characteristics of the imaging apparatus and necessary tomographic images. These obtained images are reconstructed to generate tomographic images by using back projection techniques such as a simple back projection technique, a filtered back projection technique, or the like.

However, when radiographic images are obtained, high quality images need to be secured with a minimal dose of radiation irradiated onto a subject. Accordingly, irradiation control conditions need to be set such that a desired dose of radiation is irradiated onto a region of interest to obtain appropriate images within the region of interest in a subject. Therefore, radiographic imaging apparatuses including an automatic exposure control (AEC, Automatic Exposure Control) system which controls a dose of radiation irradiated onto subjects from a radiation source based on results of detecting a dose of radiation transmitted through the subjects have been proposed. In particular, a radiation detector is provided with a plurality of AEC sensors for performing AEC and is designed to selectively use only the AEC sensors provided within the range of positions at which radiation passes through a subject so that AEC can be realized more preferably.

When the above-described tomosynthesis imaging method is carried out, a projection position of a certain part within a subject, which is projected onto the radiation detector, varies depending on the positions of the radiation source from which images are obtained. In this case, the above-described AEC sensors are only placed at not more than five positions on the radiation detector. Accordingly, if the radiation source position is changed, the radiation incident upon AEC sensor at a certain position is transmitted through a different part of the subject. For example, when imaging at one radiation source position, the radiation transmitted through an osseous part within a subject is irradiated onto an AEC sensor at one position. Whereas, when imaging at another radiation source position, the radiation transmitted through a soft part such as visceral organ or the like is irradiated onto an AEC sensor at another position.

Since an osseous part and a soft part differ in transmittance of radiation, when intending to irradiate the same dose of radiation irrespective of the radiation source positions by using AEC sensors during a tomosynthesis imaging operation, the irradiation times are different between a case where the radiation transmitted through the osseous part is irradiated onto an AEC sensor and a case where the radiation transmitted through the soft part is irradiated onto an AEC sensor. In this manner, if the irradiation times are different, the overall density of each of the plurality of obtained images also differs, and thereby, when reconstructing images, high quality tomographic images cannot be obtained.

A biopsy apparatus performs biopsy, in which a hollow needle for collecting tissue slices (hereinafter referred to as a biopsy needle) is inserted into the patient, and tissue slices embedded in the hollow of the needle are collected, as a technique for collecting tissue slices without imposing a heavy burden on a patient. A technique for obtaining radiographic images by performing a preliminary imaging operation, in which a low dose of radiation is irradiated onto a subject in advance to avoid reducing the accuracy of a radiation dose of AED sensors due to the existence of a biopsy needle, and controlling the radiation dose at the time of the actual imaging by using the radiographic images has been proposed (please refer to Japanese Unexamined Patent Publication No. 2010-279516).

Further, Japanese Unexamined Patent Publication No. 2010-279516 also proposes a technique for employing a portion of pixels that constitute a radiation detector as AEC sensors when the system for reading out images in the radiation detector is the TFT system. As disclosed in Japanese Unexamined Patent Publication No. 2010-279516, if a portion of the pixels that constitute the radiation detector is used as AEC sensors, the number of AEC sensors can be substantially increased so that when pixels are selected to be used as AEC sensors according to the radiation source position, exposure control can be achieved to irradiate the same dose of radiation to a subject, irrespective of the radiation source position.

Further, a technique for detecting the amount of current that flows through pixels that constitute a radiation detector and controlling the irradiation time of radiation by using the result of the detection has also been proposed (please refer to Japanese Unexamined Patent Publication No. 2001-010870). In the technique disclosed in Japanese Unexamined Patent Publication No. 2001-010870, the amount of the current that flows through the pixels upon irradiation of radiation is detected by using a detecting means, which is provided in the radiation detector, for detecting the amount of the current.

Automatic exposure control can be achieved to irradiate the same dose of radiation to a subject irrespective of radiation source positions for every imaging operation by applying the technique disclosed in Japanese Unexamined Patent Publication No. 2010-279516 as stated above to tomosynthesis imaging. However, the technique disclosed in Japanese Unexamined Patent Publication No. 2010-279516 is for controlling the radiation dose at the time of the actual imaging operation by performing a preliminary imaging, which increases the frequency of imaging operations. As a result thereof, the amount of exposure to radiation for a subject, i.e., a patient, is increased. Meanwhile, when employing the radiation detector disclosed in Japanese Unexamined Patent Publication No. 2001-010870, a dose of radiation can be detected without carrying out any preliminary imaging operations. However, the radiation detector disclosed in Japanese Unexamined Patent Publication No. 2001-010870 needs to be provided with a detecting means for detecting the amount of current, which is unnecessary in conventional radiation detectors, and thus the circuit size and the production cost thereof will be increased.

In view of the above-described circumstances, the object of the present invention is to enable automatic control of a dose of radiation with a radiation detector having a simple configuration, without increasing the amount of exposure to radiation for a subject.

SUMMARY OF THE INVENTION

A radiographic imaging apparatus according to the present invention comprises:

a radiation source for irradiating radiation onto a subject;

a radiation detector having a great number of pixels each equipped with an accumulation unit for generating electric charges upon receiving the radiation and accumulating the generated electric charges and a TFT switch for reading out the electric charges accumulated in the accumulation unit, a plurality of scanning lines for turning the TFT switches ON/OFF, and a number of data lines for reading-out the electric charges accumulated in the accumulation units as image signals, a plurality of short-circuited pixels formed by short-circuiting TFT switches being arranged across the entire surface of the radiation detector;

an image obtaining unit for relatively moving the radiation source with respect to the radiation detector, irradiating the radiation onto the subject at a plurality of radiation source positions associated with the movement of the radiation source, and obtaining a plurality of images corresponding to each of the plurality of radiation source positions;

a short-circuited pixel setting unit for setting a position of a detection short-circuited pixel to detect a dose of the radiation corresponding to each of the plurality of radiation source positions from among the plurality of short-circuited pixels; and a dose control unit for controlling the dose of radiation output from the radiation source, based on electric signals read out from the detection short-circuited pixels, at each of the plurality of radiation source positions.

The expression "relatively moving the radiation source with respect to the radiation detector" includes both a case where only the radiation source is moved with a detecting means being fixed and a case where both of the detecting means and the radiation source are moved in synchronization. Further, the movement may be either a movement along a straight line or a movement along an arc.

The expression "short-circuited pixels . . . being arranged across the entire surface of the radiation detector" can be achieved, for example, by arranging the short-circuited pixels at predetermined pixel intervals or randomly.

The expression "short-circuiting TFT switches" refers to both ends of the TFT switches being electrically connected such that the TFT switches are substantially always ON.

It should be noted that the radiographic imaging apparatus according to the present invention may further include a reconstruction means for reconstructing tomographic images from the plurality of obtained images.

Further, in the radiographic imaging apparatus according to the present invention, the short-circuited pixel setting unit may be a means for setting the positions of the detection short-circuited pixels, according to the plurality of radiation source positions, the distances between the subject and the plurality of radiation source positions, and the distance between the subject and the radiation detector.

A radiographic imaging method according to the present invention is a radiographic imaging method that employs a radiographic imaging apparatus comprising: a radiation detector having a great number of pixels each equipped with an accumulation unit for generating electric charges upon receiving the radiation and accumulating the generated electric charges and a TFT switch for reading out the electric charges accumulated in the accumulation unit, a plurality of scanning lines for turning the TFT switches ON/OFF, and a number of data lines for reading-out the electric charges accumulated in the accumulation units as image signals, a plurality of short-circuited pixels formed by short-circuiting TFT switches being arranged across the entire surface of the radiation detector; an image obtaining unit for relatively moving the radiation source with respect to the radiation detector, irradiating the radiation onto the subject at a plurality of radiation source positions associated with the movement of the radiation source, and obtaining a plurality of images corresponding to each of the plurality of radiation source positions; and a short-circuited pixel setting unit for setting a position of a detection short-circuited pixel to detect a dose of the radiation corresponding to each of the plurality of radiation source positions from among the plurality of short-circuited pixels; the method comprising:

controlling the dose of radiation output from the radiation source, based on electric signals read out from the detection short-circuited pixels, at each of the plurality of radiation source positions.

According to the present invention, the radiation detector, on which a plurality of the short-circuited pixels formed by short circuiting TFT switches are arranged across the entire surface thereof is employed. The positions of the detection short-circuited pixels are set to detect a dose of radiation corresponding to each of the plurality of the radiation source positions from among the plurality of short-circuited pixels. The dose of radiation output from the radiation source is controlled based on electric signals read out from the detection short-circuited pixels, at each of the plurality of radiation source positions. When automatically controlling the dose of radiation, as with the technique disclosed in Japanese Unexamined Patent Publication No. 2010-279516, no preliminary imaging is necessary, which can decrease the number of imaging operations and thereby reduce the amount of exposure to radiation for a subject. Further, since the short-circuited pixels on the radiation detector are formed by short-circuiting TFT switches, the electric charges of short-circuited pixels can be detected as electric signals without providing any particular detecting means. Consequently, the dose of radiation irradiated onto the subject at a plurality of radiation source positions can be controlled to be the same, without upsizing of the circuit size of the radiation detector or increasing costs. As a result, the quality of a plurality of obtained images can be uniform.

DESCRIPTION OF THE PREFERRED EMBODIMENTS

Figure 1:
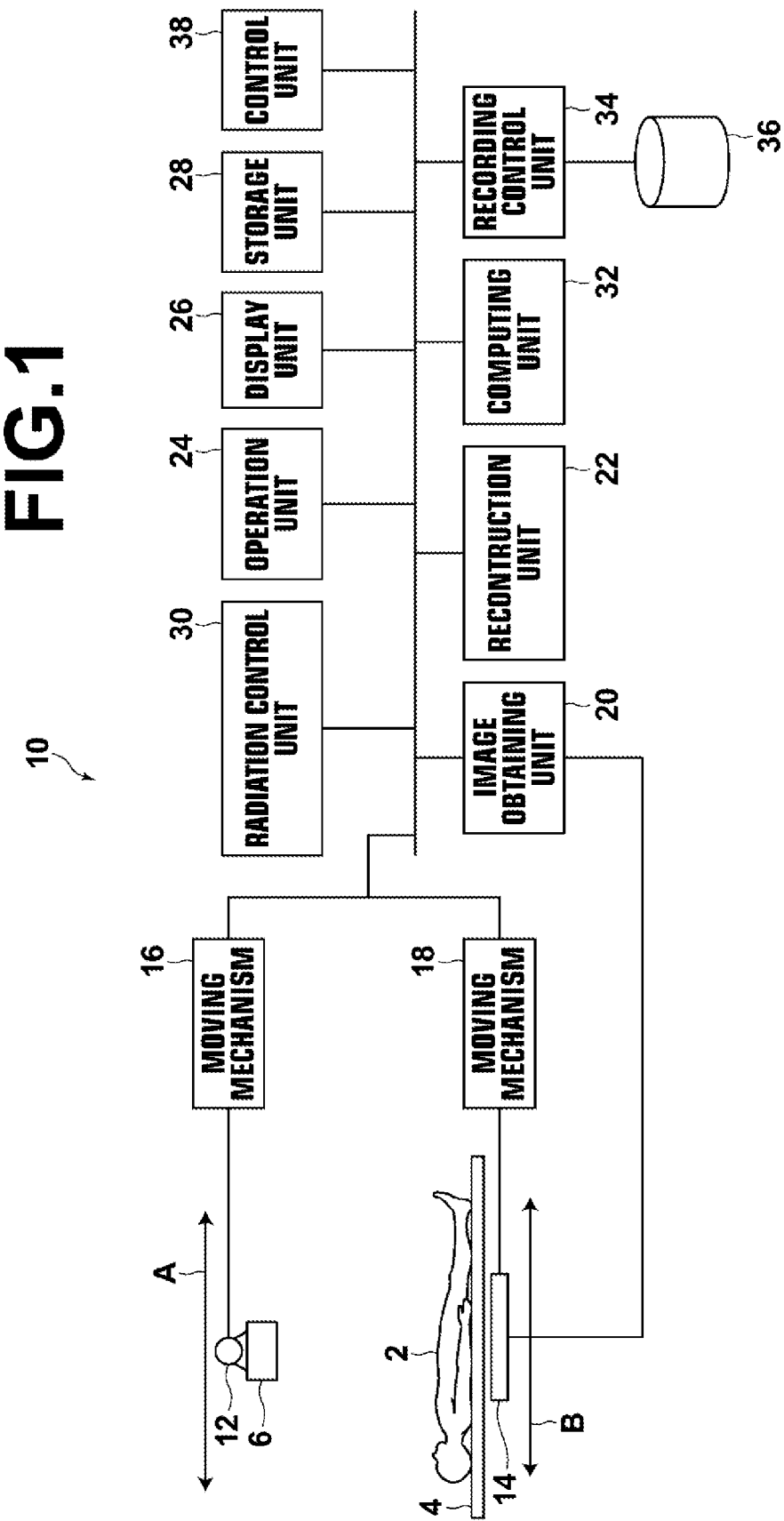
FIG. 1 is a schematic diagram illustrating a radiographic imaging apparatus according to an embodiment of the present invention.

Hereinafter, an embodiment of the present invention will be described with reference to the drawings. FIG. 1 is a schematic diagram of a radiographic imaging device according to an embodiment of the invention. As shown in FIG. 1, the radiographic imaging apparatus 10 according to this embodiment carries out a tomosynthesis imaging operation and includes a radiation source 12 and a flat panel radiation detector (hereinafter, simply referred to as a radiation detector) 14. The radiation source 12 is moved along a line or a circular arc by means of a moving mechanism 16 and irradiates radiation toward a subject 2 on an imaging platform 4 at a plurality of positions along its path of movement. In this embodiment, the radiation source 12 is moved back and forth in the direction of an arrow A along a straight linear path. Further, the dose of radiation irradiated toward the subject 2 is controlled to be a predetermined amount by a control unit to be described later. The moving mechanism 16 is controlled to move the radiation source 12 by the control unit to be described later.

The radiation source 12 is connected to a collimator (irradiation field iris) 6 and is designed to allow an operator to set the range of radiation (irradiation range) with which a subject is to be irradiated. Further, when setting the range of irradiation by using the collimator 6, visible light, instead of radiation, is irradiated onto the subject 2 through the collimator 6. The visible light is emitted from an irradiation field lamp (not shown) provided on the collimator 6. Thereby, the operator can adjust the range of the visible light irradiated onto the subject 2 by using the collimator 6 so as to set the irradiation range of radiation.

The radiation detector 14 is arranged to face the radiation source 12 with the imaging platform 4, on which the subject 2 is placed, sandwiched therebetween so as to detect radiation transmitted through the subject 2. The radiation detector 14 moves along a line or a circular arc by means of a moving mechanism 18 if necessary, and detects radiation transmitted through the subject 2 at a plurality of positions along its path of movement. Note that in this embodiment, the radiation detector 14 is moved back and forth in the direction of an arrow B along a straight line path.

Figure 2:
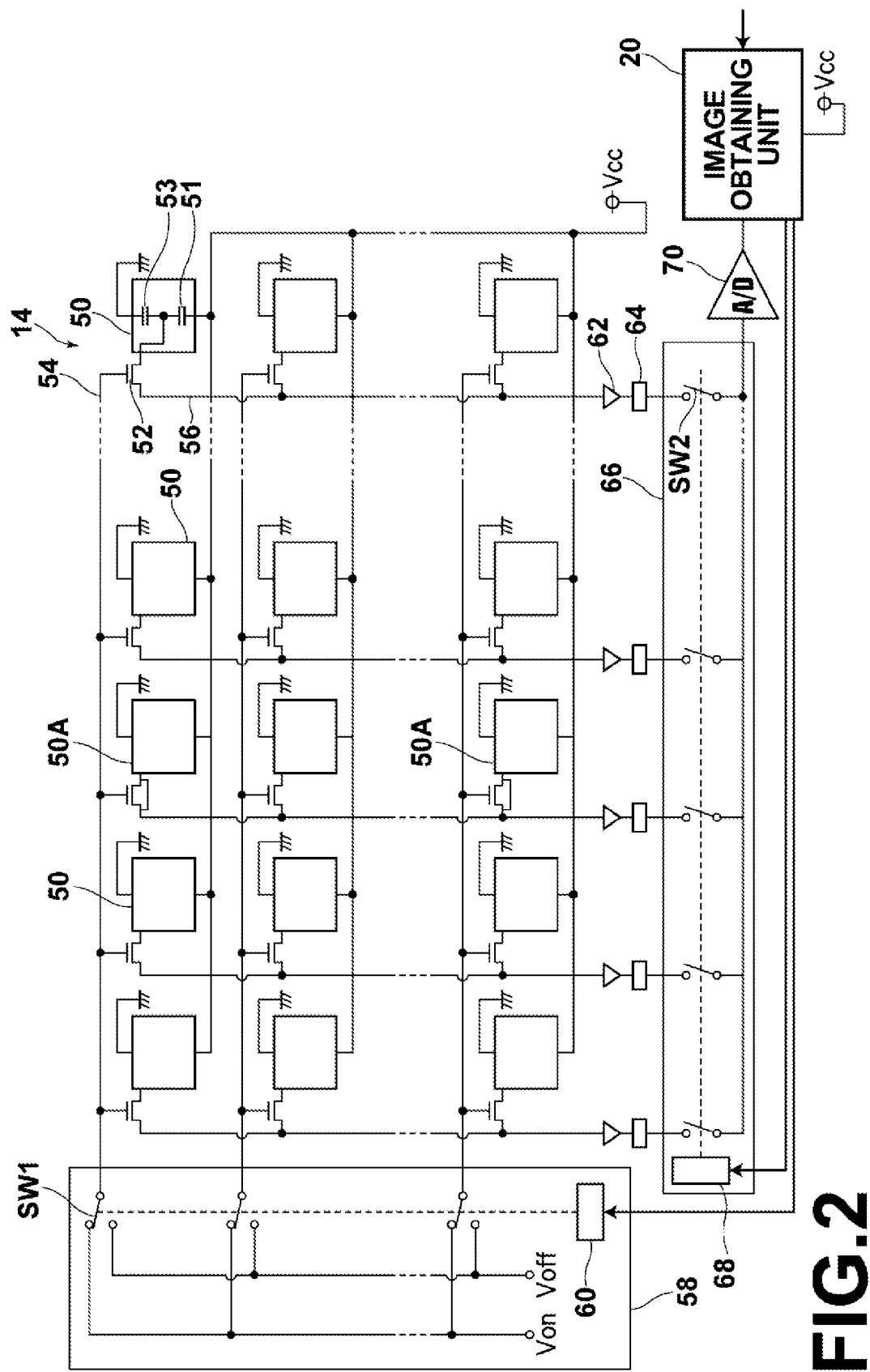
FIG. 2 is a circuit configuration block diagram of a radiation detector.

FIG. 2 is a circuit configuration block diagram of the radiation detector 14. The radiation detector 14 includes a structure, in which a photoelectric conversion layer 51 formed of materials such as amorphous selenium (a-Se) and the like that sense radiation and generate charges are arranged on an array of thin film transistors (TFT: Thin Film Transistor, hereinafter referred to as TFT switches) 52 in a line. After the charges generated in the photoelectric conversion layer 51 are stored in a storage capacitor 53, the TFT switches 52 are sequentially turned on for each line to read out the charges stored in the storage capacitor 53, as an image signal. In FIG. 2, only the relationship of a connection between a single pixel 51 and a single TFT switch 52 is shown, and the construction of the other pixels 50 is omitted.

The TFT switch 52 connected to each pixel 50 of the radiation detector 14 in rows is connected to a gate line 54 which extends parallel to a row direction, and to a signal line 56 which extends parallel to a column direction. Each of the gate lines 54 is connected to a line scan drive unit 58 and each of the signal lines 56 is connected to a multiplexer 66. Control signals Von, Voff is provided for performing ON/OFF control of the TFT switches 52 arranged in a row direction to the gated line 54 from the line scan drive unit 58. In this case, the line scan drive unit 58 includes a plurality of switches SW1 for switching the gate line 54, and an address decoder 60 for outputting a selecting signal for selecting one of the switches SW1. The address decoder 60 is supplied with an address signal from an image obtaining unit 20 to be described later.

Furthermore, electric charges retained in the storage capacitor 53 of each of pixel 50 are output to the signal line 56 via the TFT switches 52 arranged in a row. The electric charges are amplified by an amplifier 62. The amplifier 62 is connected to the multiplexer 66 through a sample hold circuit 64. The multiplexer 66 includes a plurality of switches SW2 for switching among the signal lines 56, and an address decoder 68 for outputting a selecting signal for selecting one of the switches SW2. The address decoder 68 is supplied with an address signal from the image obtaining unit 20. The multiplexer 66 is connected to an A/D converter 70, and an image signal that is converted to a digital signal by the A/D converter 70 is output into the image obtaining unit 20.

Furthermore, in FIG. 2, a case in which the TFT system is employed as the radiation detector 14 is exemplified. Alternatively, the radiation detector 14 may be that which employs an optical read-out system. Specifically, the radiation detector 14 of the optical read-out system indirectly converts radiation to charges by using phosphor materials and photoelectric conversion elements (photodiodes), instead of using radiation to charge converter materials such as the above described amorphous selenium, which directly converts radiation to charge. Photoelectric conversion elements such as gadolinium sulfate (GOS) and cesium iodide (CsI) are well known. In this case, radiation to light conversion is performed by using the fluorescent material, and light to electric charge conversion is performed by using the photodiodes, which are photo electric conversion elements.

It should be noted that the radiation detector 14 according to this embodiment is provided with short-circuited pixels 50A in which TFT switches 52 are short circuited. When both ends of a TFT switch 52 are electrically connected, the short-circuited pixel 50A continuously outputs electric charges to the signal line 56 even without the control signal Von from the line scan control unit 58, because the TFT switch 52 is short circuited. In this embodiment, the short-circuited pixels 50A are used for automatic exposure control (hereinafter referred to as AEC). AEC will be discussed below.

Figure 3:
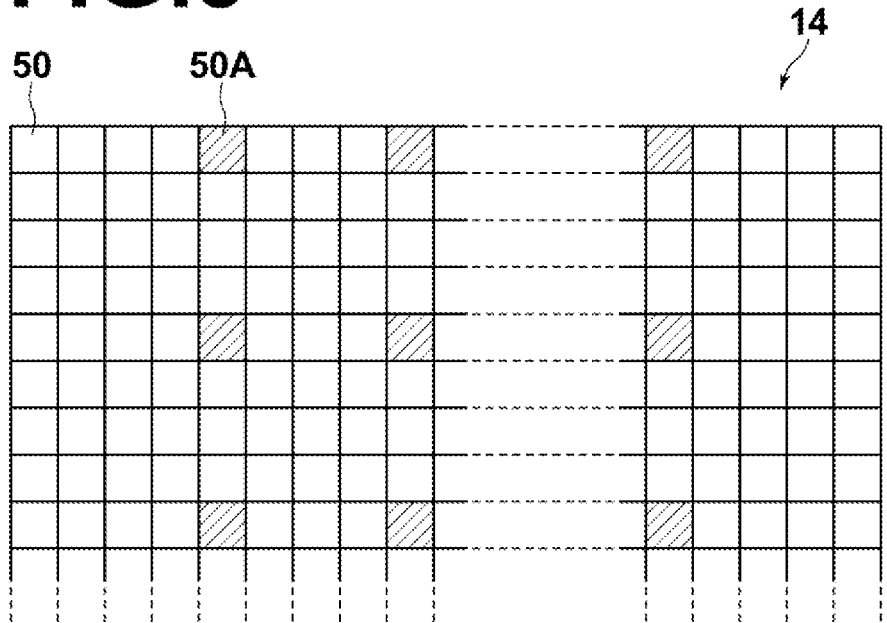
FIG. 3 is a schematic diagram illustrating an arrangement of short-circuited pixels in a radiation detector.

FIG. 3 is a schematic diagram illustrating an arrangement of short-circuited pixels in a radiation detector. FIG. 3 briefly shows merely the arrangement of pixels in the radiation detector 14. In FIG. 3, the short circuited pixels 50A are indicated by hatching. Further, as shown in FIG. 3, the short-circuited pixels 50A are arranged across the entire surface of the radiation detector 14 in both directions of rows and columns, for example, at a predetermined interval of 5 pixels. Further, the intervals among the short-circuited pixel 50A are not limited to 5 pixels, but may be any interval, such as 10 pixels, 20 pixels, 100 pixels, or the like. Alternatively, the short-circuited pixels 50A may be randomly arranged across the entire surface of the radiation detector 14.

Further, the radiographic imaging apparatus 10 includes an image obtaining unit 20 and a reconstruction unit 22. The image obtaining unit 20 irradiates radiation onto the subject 2 at a plurality of radiation source positions (i.e., positions at which the subject 2 is irradiated with radiation) in association with movement of the radiation source 12 and obtains a plurality of images at each of the plurality of radiation source positions by detecting the radiation transmitted through the subject 2 by means of the radiation detector 14.

The reconstruction unit 22 reconstructs a plurality of images obtained by the image obtaining unit 20 so as to generate tomographic images showing desired profiles of the subject 2. In this embodiment, the reconstruction unit 22 reconstructs these obtained images to generate tomographic images by means of shift addition or back projection, such as simple back projection or filtered back projection.

Further, the radiographic imaging apparatus 10 includes an operation unit 24, a display unit 26 and a storage unit 28. The operation unit 24 includes a keyboard, a mouse or a touch-panel input device and receives operations of the radiographic imaging apparatus 10 by an operator. The operation unit 24 further receives input and instructions for correction of various kinds of information such as imaging conditions and the like necessary for carrying out a tomosynthesis imaging operation. In this embodiment, every unit of the radiographic imaging apparatus 10 operates according to the information input by an operator from the operation unit 24. The display unit 26 is a display device such as a LCD monitor and the like, and displays messages and the like necessary for operations, in addition to images obtained by the image obtaining unit 20 and tomographic images reconstructed by the reconstruction unit 22. Further, the display unit 26 may have a built in speaker for outputting audio. The storage unit 28 stores various kinds of parameters and the like for setting imaging conditions necessary for operating the radiographic imaging apparatus 10. Further, standard values corresponding to parts to be imaged are stored in the storage unit 28, and the various kinds of parameters are corrected by operator instructions from the operation unit 24 as necessary.

The parameters for setting imaging conditions include a reference plane, an angle of cross-section, a radiation source distance, the number of shots, the intervals among shots, and tube voltage, tube current and the like of the radiation source 12. Further, among these parameters, the number of shots, the intervals among shots, and tube voltage, tube current and the like of the radiation source 12 are the imaging conditions.

The reference plane defines the range in which tomographic images are obtained. For example, a plane of the top plate of the imaging platform 4, a detecting surface of the radiation detector 14 or any cross-section on the subject 2 may be used as the reference plane. The angle of cross-section is an angle that faces two ends defining a range of movement of the radiation source 12 from reference points on a reference plane. The reference points are determined by using a point at the intersection of a perpendicular line drawn through the centroid of the radiation detector 14 and the reference plane. In this case, since the detecting surface of the radiation detector 14 is parallel to the moving path of the radiation source 12, the source distance is the distance closest to the detecting surface of the radiation detector 14 along the moving path of the radiation source 12.

The number of shots is the number of imaging operations during the period in which the radiation source 12 moves from one end to the other end within the range of an angle of cross-section. The intervals among shots are temporal intervals between each sequential shot.

Further, the radiographic imaging apparatus 10 includes a radiation control unit 30. The radiation control unit 30 controls the timings of irradiation of radiation from the radiation source 12 and radiation generation conditions (i.e., tube current, tube voltage and the like) according to parameters for setting the imaging conditions. When radiation is irradiated onto the radiation detector 14, electric charges are continuously output from the short-circuited pixels 50A so that electric signals (hereinafter referred to as short-circuited pixel signals) based on the electric charges output from the short-circuited pixels 50A correspond to a radiation dose irradiated onto the radiation detector 14. For this reason, the radiation control unit 30 performs AEC by using the short-circuited pixel signals obtained by the image obtaining unit 20. In particular, the radiation control unit 30 controls the radiation source 12 such that irradiation of radiation starts before detecting the short-circuited pixel signals at each position of the radiation source, and the irradiation of radiation is suspended when an accumulated value of the short-circuited pixel signals becomes a value corresponding to a radiation dose specified by the radiation generation conditions as stated above.

Further, the radiographic imaging apparatus 10 includes a computing unit 32. The computing unit 32 calculates imaging conditions such as the range of movement of the radiation source 12, the position of the radiation source 12 at each imaging operation (hereinafter referred to as radiation source position), the time of imaging, the traveling speed of radiation source and the like, according to parameters stored in the storage unit 28. Further, the computing unit 32 sets which short-circuited pixel 50A among the short-circuited pixels 50A contained in the radiation detector 14 is used for AEC when performing AEC.

Figure 4:
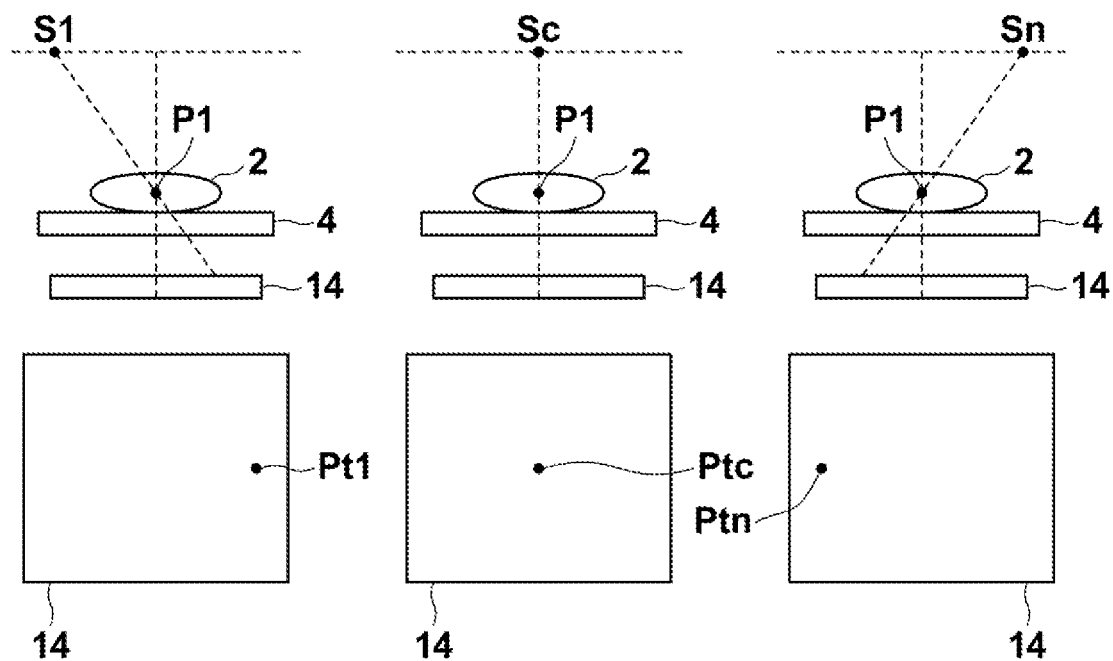
FIG. 4 is a diagram illustrating how a projection position of a part contained in a predetermined position within a subject moves according to the position of a radiation source.

FIG. 4 is a diagram illustrating how a projection position of a part contained in a predetermined position within a subject moves according to a position of a radiation source. As shown in FIG. 4, in the case where the radiation source 12 is at a first radiation source position S1 of the range of movement thereof, the projection position corresponding to a predetermined position P1 of the subject 2 is a position Pt1 on the right side of the radiation detector 14. In the case where the radiation source 12 is at the radiation source position Sc in the middle of the range of movement thereof, the projection position of the predetermined position P1 is a position Ptc in the middle of the radiation detector 14. In the case where the radiation source 12 is at the last radiation source position Sn of the range of movement thereof, a projection position corresponding to a predetermined position P1 is a position Ptn on the left side of the radiation detector 14. In this manner, if the position of the radiation source 12 is changed, a predetermined position P1 of the subject 2 is projected onto a different position on the radiation detector 14. Further, a projection position moves in the direction of movement of the radiation source 12, but does not move in a direction perpendicular to the direction of movement.

Figure 5:
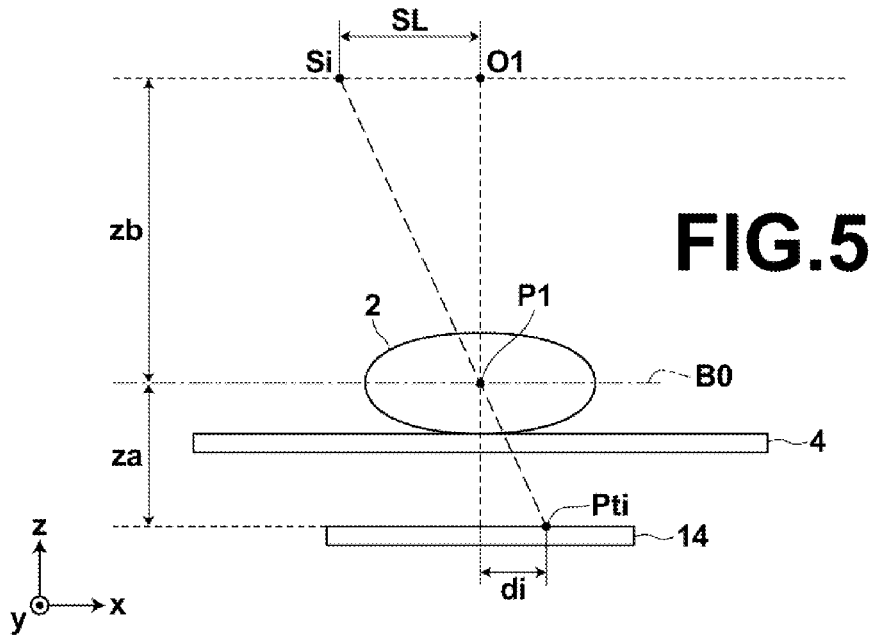
FIG. 5 is a diagram for explaining calculation of a projection position.

The computing unit 32 calculates a projection position at the radiation detector 14 corresponding to a predetermined position P1, based on the positional relationship between each of the radiation source positions and a predetermined position P1 of the subject 2. FIG. 5 is a diagram for explaining calculation of a projection position. Further, in FIG. 5 and the following description, the direction in which the radiation source 12 moves is an x direction, the direction perpendicular thereto is a y direction, and is the direction perpendicular to the drawing sheet is a z direction. Further, in FIG. 3, a point at the intersection of the perpendicular line drawn through the centroid of the radiation detector 14 and the range of movement of the radiation source 12 is a reference position O1, and a projection position of a predetermined position P1 onto the radiation detector 14 is Pti (i=1 through n).

The distance from the detecting surface of the radiation detector 14 to the top board of the imaging platform 4, the coordinate location and the source distance of the i th radiation source position Si are known and stored in the storage unit 28. Further, the height from the top board of the imaging platform 4 to a plane BO that passes through the predetermined position P1 can be obtained by measurement. Accordingly, a distance za from the radiation detector 14 to the plane BO and a distance zb from the radiation source 12 to the range of movement can be calculated, and a distance SL between the reference position O1 and the radiation source position Si further can be calculated. Therefore, a distance di in a x direction from the centroid of the detecting surface the radiation detector 14 to a projection position Pti may be calculated by the following equation (1). Further, a position in a y direction of the projection position Pti can be calculated based on the positional relationship between a calculated value of a predetermined position P1 and a position in a y direction of the radiation detector 14.

$$di = SL \times za/zb \qquad (1)$$

The radiation control unit 30 selects AEC short-circuited pixels 50B for use in AEC among the plurality of short-circuited pixels 50A on the radiation detector 14, based on the projection position of the predetermined position P1 corresponding to each of the radiation source positions of the radiation source 12. In particular, the short-circuited pixels 50A in the vicinity of a projection position Pti are selected as AEC short-circuited pixels 50B for every radiation source position. For example, as shown in FIG. 4, in the case where a radiation source position is S1, the short-circuited pixels 50A in the vicinity of a position Pt1 of the radiation detector 14 are selected as AEC short-circuited pixels 50B, in the case where a radiation source position is Sc, the short-circuited pixels 50A in the vicinity of a position Ptc of the radiation detector 14 are selected as AEC short-circuited pixels 50B, and in the case where a radiation source position is Sn, the short-circuited pixels 50A in the vicinity of a position Ptn of the radiation detector 14 are selected as AEC short-circuited pixels 50B. It should be noted that the number of AEC short-circuited pixels 50B may be just singular or plural.

In this manner, AEC short-circuited pixels 50B are selected because AEC can be performed based on the radiation transmitted through a common part of the subject 2. As a result, the radiation dose irradiated onto the subject 2 as well as the density of the obtained images can be the same.

Further, the radiographic imaging apparatus 10 includes a recording control unit 34 for recording tomographic images and a plurality of obtained images. The recording control unit 34 records the tomographic images and the plurality of obtained images in a recording medium 36 comprising, for example, a hard disk, a semiconductor memory, etc.

Further, the radiographic imaging apparatus 10 includes a control unit 38 for controlling each unit of the radiographic imaging apparatus 10. The control unit 38 controls each unit of the radiographic imaging apparatus 10 according to instructions from the operating unit 24.

Figure 6:
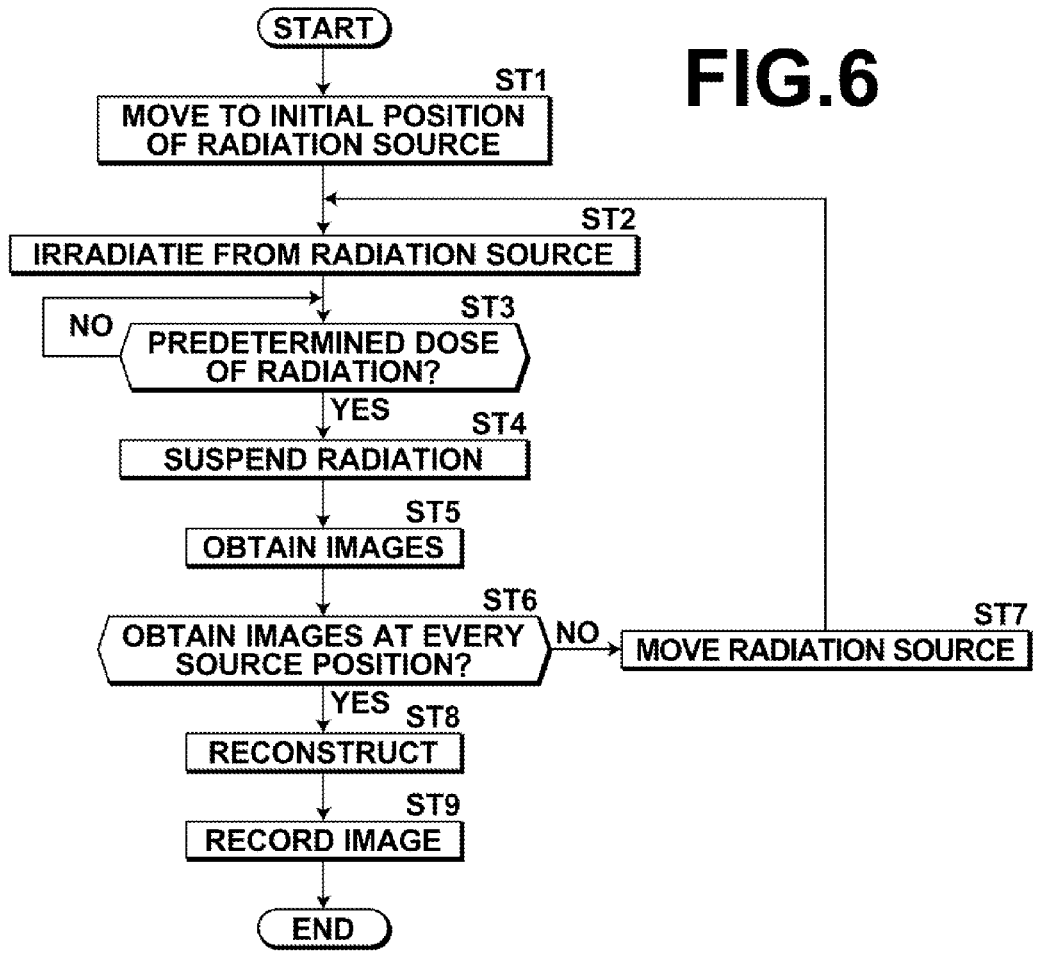
FIG. 6 is a flow chart illustrating a process carried out by the radiographic imaging apparatus according to the embodiment of the present invention.

Next, the process carried out by this embodiment will be described. FIG. 6 is a flow chart illustrating a process carried out by the radiographic imaging apparatus according to the embodiment of the present invention. A case will be described in which a tomosynthesis imaging operation is performed by moving only the radiation source 12 without moving the radiation detector 14. Further, AEC short-circuited pixels 50B are preset by the computing unit 32, and the positions thereof are stored in the storage unit 28. When the operating unit 24 receives an instruction to start the process from an operator, the control unit 38 initiates the process so that the moving mechanism 16 moves the radiation source 12 to an initial position (Step ST1). Then, the radiation control unit 30 irradiates radiation toward the subject 2 from the radiation source 12 (Step ST2). In this occasion, the radiation control unit 30 starts to monitor whether a predetermined dose of radiation, which is specified by the radiation generation conditions, is irradiated onto the subject 2, based on the short-circuited pixel signals from the AEC short-circuited pixels 50B (Step ST3).

If an affirmative determination is made in Step ST3, the radiation control unit 30 suspends irradiation of radiation from the radiation source 12 (Step ST4), and the image obtaining unit 20 reads out image signals from the radiation detector 14 so as to obtain images at the current radiation source position Si (Step ST5).

Then, the control unit 38 judges whether images have been obtained at every radiation source position (Step ST6). If a negative determination is made in Step ST6, the current radiation source position is moved to the next radiation source position (Step ST7), Step ST2 is returned to and the steps following Step ST2 are repeated.

If an affirmative determination is made in Step ST6, the reconstruction unit 22 reconstructs the plurality of obtained images and generates tomographic images (Step ST8). Then, the recording control unit 34 records the plurality of images and the tomographic images in the recording medium 36 (Step ST9) and the process is completed.

In this manner, in this embodiment, the radiation detector 14, on which a plurality of the short-circuited pixels 50A formed by short circuiting TFT switches 52 are arranged across the entire surface thereof is employed. The positions of the detection short-circuited pixels 50B are set to detect a dose of radiation corresponding to each of the plurality of the radiation source positions from among the plurality of short-circuited pixels. The dose of radiation output from the radiation source is controlled based on electric signals read out from the detection short-circuited pixels 50B, at each of the plurality of radiation source positions. For this reason, when automatically controlling the dose of radiation, as with the technique disclosed in Japanese Unexamined Patent Publication No. 2010-279516, no preliminary imaging is necessary, which can decrease the number of imaging operations and thereby reduce the amount of exposure to radiation for a subject. Further, since the short-circuited pixels 50A on the radiation detector are formed by short-circuiting the TFT switches 52, the electric charges of the short-circuited pixels 50A can be detected as electric signals without providing a special detecting means. Consequently, the dose of radiation irradiated onto the subject at a plurality of radiation source positions can be controlled to be the same, without upsizing of the circuit size of the radiation detector or increasing costs. As a result, the quality of a plurality of obtained images can be uniform.

Further, in the above-described embodiment, only the radiation source 12 is moved, but the radiation source 12 and the radiation detector 14 may be designed to be moved in synchronization. In this case as well, AEC short-circuited pixels 50B at the radiation detector 14 can be set, according to the geometric positional relationship between a plurality of radiation source positions and the radiation detector 14.

Moreover, in the above-described embodiment, a tomosynthesis imaging operation is carried out with a subject laid on the imaging platform in a supine position. However, the present invention can be applied to the case in which a tomosynthesis imaging operation is carried out by using upright imaging platforms.

Further, in the above-described embodiment, a radiographic imaging apparatus performs a tomosynthesis imaging operation according to the present invention. Since such an apparatus can obtain images by irradiating radiation onto a subject from a plurality of radiation source positions, it goes without saying that the present invention of this application can be applied to a stereo-radiographic apparatus for obtaining, for example, stereoscopic images.

What is claimed is:
1. A radiographic imaging apparatus comprising:
    an x-ray radiation source for irradiating x-ray radiation onto a subject;
    an x-ray radiation detector having a great number of pixels each equipped with an accumulation unit for generating electric charges upon receiving the x-ray radiation and accumulating the generated electric charges and a TFT switch for reading out the electric charges accumulated in the accumulation unit, a plurality of scanning lines for turning the TFT switches ON/OFF, and a number of data lines for reading-out the electric charges accumulated in the accumulation units as image signals, a plurality of short-circuited pixels formed by short-circuiting TFT switches being arranged across the entire surface of the x-ray radiation detector;

an image obtaining unit for relatively moving the x-ray radiation source with respect to the x-ray radiation detector, irradiating the x-ray radiation onto the subject at a plurality of x-ray radiation source positions associated with the movement of the x-ray radiation source, and obtaining a plurality of images corresponding to each of the plurality of x-ray radiation source positions;

a short-circuited pixel setting unit for setting a position of a detection short-circuited pixel to detect a dose of the x-ray radiation corresponding to each of the plurality of x-ray radiation source positions from among the plurality of short-circuited pixels; and a dose control unit for controlling the dose of x-ray radiation output from the x-ray radiation source, based on electric signals read out from the detection short-circuited pixels, at each of the plurality of x-ray radiation source positions.

2. The radiographic imaging apparatus as claimed in claim 1, further comprising a reconstruction unit for reconstructing tomographic images from the plurality of obtained images.

3. The radiographic imaging apparatus as claimed in claim 1, wherein the short-circuited pixel setting unit sets the positions of the detection short-circuited pixel, according to the plurality of x-ray radiation source positions, the distances between the subject and the plurality of x-ray radiation source positions, and the distance between the subject and the x-ray radiation detector.

4. The radiographic imaging apparatus as claimed in claim 2, wherein the short-circuited pixel setting unit sets the positions of the detection short-circuited pixel, according to the plurality of x-ray radiation source positions, a distance between the subject and the plurality of x-ray radiation source positions, and a distance between the subject and the x-ray radiation detector.

5. A radiographic imaging method, comprising:

employing a radiographic imaging apparatus comprising an x-ray radiation source for irradiating x-ray radiation onto a subject; an x-ray radiation detector having a great number of pixels each equipped with an accumulation unit for generating electric charges upon receiving the x-ray radiation and accumulating the generated electric charges and a TFT switch for reading out the electric charges accumulated in the accumulation unit, a plurality of scanning lines for turning the TFT switches ON/OFF, and a number of data lines for reading-out the electric charges accumulated in the accumulation units as image signals, a plurality of short-circuited pixels formed by short-circuiting TFT switches being arranged across the entire surface of the x-ray radiation detector; an image obtaining unit for relatively moving the x-ray radiation source with respect to the x-ray radiation detector, irradiating the x-ray radiation onto the subject at a plurality of x-ray radiation source positions associated with the movement of the x-ray radiation source, and obtaining a plurality of images corresponding to each of the plurality of x-ray radiation source positions; and a short-circuited pixel setting unit for setting a position of a detection short-circuited pixel to detect a dose of the x-ray radiation corresponding to each of the plurality of x-ray radiation source positions from among the plurality of short-circuited pixels; and controlling the dose of x-ray radiation output from the x-ray radiation source, based on electric signals read out from the detection short-circuited pixels, at each of the plurality of x-ray radiation source positions.

* * * * *